(12) United States Patent
Baek et al.

(10) Patent No.: US 12,211,997 B2
(45) Date of Patent: Jan. 28, 2025

(54) POSITIVE ELECTRODE ACTIVE MATERIAL FOR LITHIUM SECONDARY BATTERY AND LITHIUM SECONDARY BATTERY

(71) Applicant: LG Chem, Ltd., Seoul (KR)

(72) Inventors: Hyeon Hui Baek, Daejeon (KR); Sung Ho Ban, Daejeon (KR); Jun Ho Eom, Daejeon (KR); Chae Jin Lim, Daejeon (KR); Sang Jo Lee, Daejeon (KR); Na Ri Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 989 days.

(21) Appl. No.: 15/734,352

(22) PCT Filed: Jun. 19, 2019

(86) PCT No.: PCT/KR2019/007402
§ 371 (c)(1),
(2) Date: Dec. 2, 2020

(87) PCT Pub. No.: WO2019/245286
PCT Pub. Date: Dec. 26, 2019

(65) Prior Publication Data
US 2021/0226206 A1   Jul. 22, 2021

(30) Foreign Application Priority Data
Jun. 20, 2018 (KR) .................. 10-2018-0071055

(51) Int. Cl.
*H01M 4/525* (2010.01)
*H01M 4/36* (2006.01)
(Continued)

(52) U.S. Cl.
CPC ........ *H01M 4/525* (2013.01); *H01M 4/366* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

| | | |
|---|---|---|
| 2012/0032647 A1 | 2/2012 | Watanabe et al. |
| 2013/0108926 A1 | 5/2013 | Kim et al. |

(Continued)

FOREIGN PATENT DOCUMENTS

| | | |
|---|---|---|
| CN | 1587067 A | 3/2005 |
| CN | 102292863 A | 12/2011 |

(Continued)

OTHER PUBLICATIONS

Wontae Lee et al., New Insight into Ni-Rich Layered Structure for Next-Generation Li Rechargeable Batteries, Oct. 4, 2017, Advanced Energy Materials 2017.
(Continued)

*Primary Examiner* — Haixia Zhang
(74) *Attorney, Agent, or Firm* — Lerner David LLP

(57) ABSTRACT

Provided is a lithium secondary battery which includes a positive electrode, a negative electrode, a separator interposed between the positive electrode and the negative electrode, and an electrolyte, wherein the positive electrode includes a lithium composite transition metal oxide powder having a layered structure and a nickel content accounting for 85 atm % or more of total transition metals, and wherein the lithium composite transition metal oxide powder undergoes a 3% or less change in lithium-oxygen (Li—O) interlayer spacing in a state-of-charge (SOC) range of 58% to 72%.

14 Claims, 1 Drawing Sheet

(51) Int. Cl.
    *H01M 4/485*     (2010.01)
    *H01M 4/505*     (2010.01)
    *H01M 10/0525*     (2010.01)
    *H01M 10/44*     (2006.01)
    *H01M 4/02*     (2006.01)

(52) U.S. Cl.
    CPC ....... *H01M 10/0525* (2013.01); *H01M 10/44* (2013.01); *H01M 2004/027* (2013.01); *H01M 2004/028* (2013.01)

(56) References Cited

U.S. PATENT DOCUMENTS

| | | | |
|---|---|---|---|
| 2015/0072232 A1 | 3/2015 | Nagai | |
| 2015/0228973 A1 | 8/2015 | Won et al. | |
| 2015/0340683 A1 | 11/2015 | Hamano et al. | |
| 2016/0013476 A1 | 1/2016 | Oh et al. | |
| 2017/0054147 A1 | 2/2017 | Yokoyama et al. | |
| 2017/0179470 A1 | 6/2017 | Choi et al. | |
| 2018/0013132 A1 | 1/2018 | Chiba et al. | |
| 2018/0138507 A1 | 5/2018 | Akimoto et al. | |
| 2018/0226678 A1* | 8/2018 | Haruna | H01M 10/0568 |
| 2018/0233739 A1 | 8/2018 | Park et al. | |
| 2018/0351169 A1 | 12/2018 | Oh et al. | |
| 2019/0027748 A1 | 1/2019 | Kim et al. | |
| 2019/0280296 A1 | 9/2019 | Li et al. | |
| 2020/0083523 A1 | 3/2020 | Hamano et al. | |

FOREIGN PATENT DOCUMENTS

| | | | |
|---|---|---|---|
| CN | 104781960 A | 7/2015 | |
| CN | 107394160 A | 11/2017 | |
| CN | 108123114 A | 6/2018 | |
| DE | 112012006167 T5 | 12/2014 | |
| EP | 3282506 A1 | 2/2018 | |
| EP | 3333961 A1 | 6/2018 | |
| JP | H1125957 A | 1/1999 | |
| JP | 2000302451 A | 10/2000 | |
| JP | 2002124261 A | 4/2002 | |
| JP | 2003123839 A | 4/2003 | |
| JP | 2005327521 A | 11/2005 | |
| JP | WO2006082708 A1 | 6/2008 | |
| JP | 2015216105 A | 12/2015 | |
| JP | 2016207316 A | 12/2016 | |
| JP | 2017043496 A | 3/2017 | |
| KR | 20130046810 A | 5/2013 | |
| KR | 20140081663 A | 7/2014 | |
| KR | 20150050458 A | 5/2015 | |
| KR | 20150092291 A | 8/2015 | |
| KR | 20150093539 A | 8/2015 | |
| KR | 20160075404 A | 6/2016 | |
| KR | 20170063407 A | 6/2017 | |
| KR | 20170073217 A | 6/2017 | |
| KR | 2017-0075596 A | 7/2017 | |
| KR | 20170113385 A | 10/2017 | |
| WO | 2016136226 A1 | 9/2016 | |
| WO | 2018105481 A1 | 6/2018 | |

OTHER PUBLICATIONS

Aleksandr O. Kondrakov et al., Charge-Transfer-Induced Lattice Collapse in Ni-Rich NCM Cathode Materials during Delithiation, Oct. 11, 2017, The Journal of Physical Chemistry C 2017.

Extended European Search Report for Application No. 19821792.9, dated May 27, 2021, 8 pgs.

Search report from Interntional Application No. PCT/KR2019/007402, mailed Sep. 23, 2019.

Search Report dated Jan. 29, 2024 from the Office Action for Chinese Application No. 201980034513.5 issued Feb. 1, 2024, 3 pages.

* cited by examiner

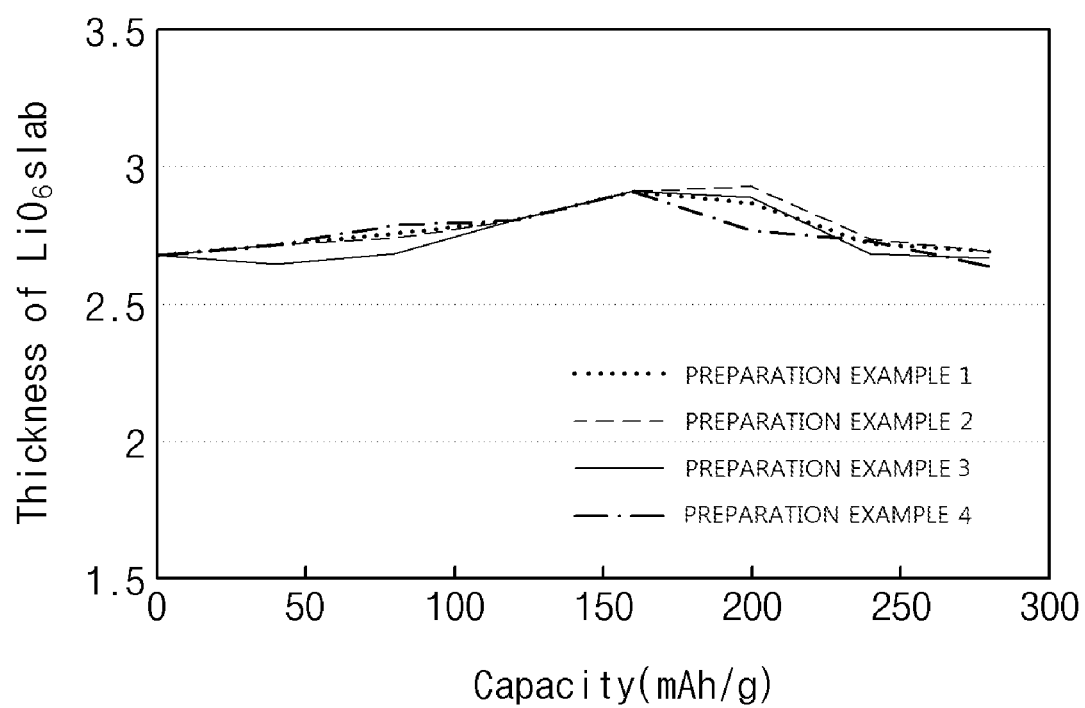

POSITIVE ELECTRODE ACTIVE MATERIAL FOR LITHIUM SECONDARY BATTERY AND LITHIUM SECONDARY BATTERY

CROSS-REFERENCE TO RELATED APPLICATIONS

The present application is a national phase entry under 35 U.S.C. § 371 of International Application No. PCT/KR2019/007402 filed on Jun. 19, 2019, which claims priority from Korean Patent Application No. 10-2018-0071055, filed on Jun. 20, 2018, the disclosures of which are incorporated herein by reference in their entirety.

TECHNICAL FIELD

The present invention relates to a lithium secondary battery, and more particularly, to a lithium secondary battery which exhibits excellent electrochemical properties even at high temperatures.

BACKGROUND ART

Recently, as environmental issues have emerged as important issues, the interest in renewable energy that can replace nuclear power generation or fossil fuels has increased. Among such renewable energy, the demand for secondary batteries which allow charging and discharging and thus have semi-permanent characteristics and allow for repeated use is growing rapidly.

Lithium secondary batteries are the most noticeable secondary batteries due to having excellent lifetime (cycle) characteristics and high energy density. As a positive electrode active material for such a lithium secondary battery, various lithium transition metal oxides such as $LiCoO_2$, $LiNiO_2$, $LiMnO_2$, $LiMn_2O_4$, $LiFePO_4$, $Li(Ni_aCo_bMn_c)O_2$ (here, a, b and c are the atomic fractions of transition metals, wherein 0<a<1, 0<b<1, 0<c<1, and a+b+c=1; this compound is hereinafter referred to as an NCM-based lithium oxide) and the like have been developed. Meanwhile, in recent years, for application to high-capacity batteries such as batteries for electric vehicles, the development of nickel (Ni)-rich NCM-based lithium oxides with an increased high-energy-density nickel content is actively ongoing.

However, in the case of lithium secondary batteries in which a Ni-rich NCM-based lithium oxide is applied, although an excellent effect is provided in terms of capacity implementation, since the structural stability and chemical stability of the active material decrease with an increasing nickel content, problems such as repeated charging and discharging degrading the structural integrity of an active material surface, battery stability being lowered due to the occurrence of an exothermic reaction entailing the rapid degradation of structural integrity, or lifetime characteristics being rapidly degraded due to structural deterioration may occur. Such a phenomenon is aggravated under high-temperature and/or high-voltage conditions, and is particularly pronounced when a positive electrode active material having a nickel content accounting for 80 atm % or more of total transition metals is used. In addition, compared to positive electrode active materials having a low nickel content, a positive electrode active material having a nickel content accounting for 80 atm % or more of total transition metals has the problem that lifetime characteristics are degraded under a high-temperature condition as cation mixing, irreversible phase transformation and the like are accelerated.

In order to address the above-described problems, techniques that improve the structural stability of a positive electrode active material through doping or coating with a metal element have been attempted. However, the techniques proposed to date have not been able to sufficiently achieve both capacity characteristics and high-temperature characteristics.

Therefore, there is a demand for the development of a lithium secondary battery having excellent high-temperature characteristics while satisfying high-capacity requirements.

DISCLOSURE

Technical Problem

The present invention is directed to providing a lithium secondary battery which, due to the inclusion of a positive electrode active material having a nickel content of 85 atm % or more, exhibits excellent lifetime characteristics even at high temperatures while having high-capacity characteristics.

Technical Solution

One aspect of the present invention provides a lithium secondary battery which includes a positive electrode, a negative electrode, a separator interposed between the positive electrode and the negative electrode, and an electrolyte, wherein the positive electrode includes, as a positive electrode active material, a lithium composite transition metal oxide powder having a layered structure and a nickel content accounting for 85 atm % or more of total transition metals, and wherein the lithium composite transition metal oxide powder undergoes a 3% or less, preferably 1% or less, change in lithium-oxygen (Li—O) interlayer spacing (i.e., $LiO_6$ slab thickness) in a state-of-charge (SOC) range of 58% to 72%.

In the lithium composite transition metal oxide powder, a Li—O interlayer spacing at 100% SOC may be greater than or equal to a Li—O interlayer spacing at 0% SOC.

In addition, the lithium composite transition metal oxide may be represented by the following Chemical Formula 1.

   [Chemical Formula 1]

In Chemical Formula 1,

M is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B and Mo, and 0.9≤x≤1.2, 0.85≤a≤0.99, 0<b<0.15, 0<c<0.15, and 0<d<0.15.

In addition, the lithium composite transition metal oxide may include, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S.

Another aspect of the present invention provides a positive electrode active material for a lithium secondary battery, the positive electrode active material including a lithium composite transition metal oxide powder having a layered structure and a nickel content accounting for 85 atm % or more of total transition metals, wherein the lithium composite transition metal oxide powder undergoes a 3% or less change in Li—O interlayer spacing (i.e., $LiO_6$ slab thickness) in a SOC range of 58% to 72%.

Advantageous Effects

Due to the inclusion of a positive electrode which includes a positive electrode active material having a nickel content of 85 atm % or more and undergoing a small change in Li—O interlayer spacing due to lithium ion deintercalation during charging and discharging, the lithium secondary battery of the present invention can exhibit excellent capacity characteristics and excellent high-temperature lifetime characteristics.

DESCRIPTION OF DRAWINGS

FIG. 1 is a graph illustrating a change in the Li—O interlayer spacing of the positive electrode active materials of Preparation Examples 1 to 4 according to a degree of charging.

DETAILED DESCRIPTION

Hereinafter, the present invention will be described in more detail.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present specification, a particle diameter Dn refers to a particle diameter corresponding to an n % point in a particle number cumulative distribution by particle diameter. That is, D50 is the particle diameter corresponding to a 50% point in the particle number cumulative distribution by particle diameter, D90 is the particle diameter corresponding to a 90% point in the particle number cumulative distribution by particle diameter, and D10 is the particle diameter corresponding to a 10% point in the particle number cumulative distribution by particle diameter. The Dn may be determined using a laser diffraction method. Specifically, a powder to be analyzed is dispersed in a dispersion medium, and the dispersion is introduced into a commercially available laser diffraction particle size measuring instrument (e.g., Microtrac S3500) in which a particle size distribution is obtained by measuring a change in diffraction pattern according to a particle size while particles are passed through a laser beam. By calculating the particle diameters corresponding to the 10%, 50% and 90% points in the particle number cumulative distribution by particle diameter obtained by the measuring instrument, the D10, the D50 and the D90 can be determined.

As a result of prolonged research to develop a lithium secondary battery that is excellent in both capacity characteristics and high-temperature lifetime characteristics, the inventors of the present invention have found that the objective is achievable by using a Ni-rich positive electrode active material that undergoes a small change in Li—O interlayer spacing in a specific SOC range, and thereby completed the present invention.

Conventionally, it has been common to analyze crystals of a positive electrode active material by an X-ray diffraction (XRD) method. However, with this conventional method, it has not been able to measure a change in the crystal structure of a positive electrode active material according to a degree of charging due to the difficulty of precise measurement.

Hence, the inventors of the present invention measured a change in the crystal structure of a positive electrode active material according to a degree of charging by obtaining high resolution powder diffraction (hereinafter abbreviated as HRPD) data using synchrotron radiation, and thereby found that, in a specific range corresponding to a charged state, the degree of change in the Li—O interlayer spacing of the positive electrode active material closely affected high-temperature lifetime characteristics. Specifically, it was found that when a positive electrode active material which had a layered structure and a nickel content accounting for 85 atm % or more of total transition metals and underwent a 3% or less change in Li—O interlayer spacing in a SOC range of 58% to 72% was used, excellent high-temperature lifetime characteristics were exhibited.

According to the research conducted by the inventors of the present invention, even among positive electrode active materials of similar compositions and the same Li—O interlayer spacing before charging and discharging, the high-temperature lifetime characteristics and the capacity characteristics were different depending on the degree of change in Li—O interlayer spacing in a SOC range of 58% to 72%.

In a Ni-rich positive electrode active material having a layered structure, the mechanism whereby a degree of change in Li—O interlayer spacing in a SOC range of 58% to 72% affects high-temperature lifetime characteristics and capacity characteristics is assumed as follows, although not clear. The lithium composite transition metal oxides having a layered crystal structure have a form in which a Li—O layer and a transition metal layer are alternately stacked, and when charged, the interlayer spacing is changed as a result of the charge compensation occurring to compensate for the loss of lithium ions following the deintercalation of lithium from the Li—O layers. In general, the Li—O interlayer spacing increases in a SOC range of 50% to 60% and decreases as the charging further proceeds. In the case of a positive electrode active material having a nickel content of 85 atm % or more, it has been found that Li—O interlayer spacing decreases in a SOC range of 58% or more. However, when Li—O interlayer spacing is drastically reduced during such a change, capacity and lifetime characteristics are degraded, possibly because an irreversible structural change has occurred in the lattice structure due to the occurrence of an additional strain therein.

Therefore, in the present invention, the capacity characteristics and high-temperature lifetime characteristics of a lithium secondary battery are improved by using a Ni-rich positive electrode active material that undergoes a small change in Li—O interlayer spacing in a SOC range of 58% to 72%.

More specifically, the lithium secondary battery of the present invention includes a positive electrode, a negative electrode, a separator interposed between the positive electrode and the negative electrode, and an electrolyte, wherein the positive electrode includes, as a positive electrode active material, a lithium composite transition metal oxide powder which has a layered structure and a nickel content accounting for 85 atm % or more of total transition metals and undergoes a 3% or less change in Li—O interlayer spacing in a SOC range of 58% to 72%.

Hereinafter, each component of the present invention will be described in detail.

(1) Positive Electrode

The positive electrode of the present invention includes a positive electrode active material layer, and the positive electrode active material layer includes, as a positive electrode active material, a lithium composite transition metal oxide powder having a layered structure and a nickel content accounting for 85 atm % or more of total transition metals.

For example, the lithium composite transition metal oxide may be represented by the following Chemical Formula 1.

$Li_x[Ni_aCo_bMn_cM_d]O_2$     [Chemical Formula 1]

In Chemical Formula 1, M is a doping element substituted at transition metal sites, and serves to improve the structural stability of the positive electrode active material. M may be, for example, one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B and Mo. Preferably, M includes two or more elements selected from the group consisting of W, Zr, Al, Ti and Mg. More preferably, M includes W and one or more elements selected from the group consisting of Zr, Al, Ti and Mg.

x represents the atomic fraction of lithium in the lithium composite transition metal oxide, and may be $0.9 \leq x \leq 1.2$, preferably $1.0 \leq x \leq 1.2$, more preferably $1.0 \leq x \leq 1.1$.

a represents the atomic fraction of nickel in the lithium composite transition metal oxide, and may be $0.85 \leq a \leq 0.99$, preferably $0.85 \leq a \leq 0.95$. When nickel is included in a large amount as such, excellent capacity characteristics can be attained.

b represents the atomic fraction of cobalt in the lithium composite transition metal oxide, and may be $0 < b < 0.15$, preferably $0 < b < 0.12$.

c represents the atomic fraction of manganese in the lithium composite transition metal oxide, and may be $0 < c < 0.15$, preferably $0 < c < 0.1$.

d represents the atomic fraction of the doping element M in the lithium composite transition metal oxide, and may be $0 < d < 0.15$, preferably $0 < d < 0.1$.

Meanwhile, the lithium composite transition metal oxide may include, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S. When such a coating layer is included, since the contact between a transition metal in the lithium composite transition metal oxide and an electrolyte is suppressed, a reduction in the structural stability of the lithium composite transition metal oxide due to a reaction with the electrolyte can be prevented.

Meanwhile, the content of transition metal elements in the lithium composite transition metal oxide may be constant regardless of a position, or the content of one or more transition metal elements may vary depending on a position inside a particle. For example, the lithium composite transition metal oxide may have a concentration gradient in which the concentration of one or more components among Ni, Mn and Co gradually changes. Here, the "concentration gradient in which a concentration gradually changes" means that there is a concentration distribution in which the concentration of a component(s) continues to gradually change throughout either an entire particle or a specific region of a particle.

Meanwhile, in the present invention, a lithium composite transition metal oxide powder which undergoes a 3% or less, preferably 1% or less, change in Li—O interlayer spacing in a SOC range of 58% to 72% is used as the positive electrode active material.

In this case, the degree of change in Li—O interlayer spacing in a SOC range of 58% to 72% may be calculated according to the following Equation (1).

Degree of change in Li—O interlayer spacing (%)={
(Li—O interlayer spacing at 58% SOC−Li—O interlayer spacing at 72% SOC)/Li—O interlayer spacing at 58% SOC}×100    Equation (1):

When the degree of change in the Li—O interlayer spacing of the lithium composite transition metal oxide powder in a SOC range of 58% to 72% exceeds 3%, a strain occurs in the lattice structure during high-temperature charging and discharging, causing the Li—O layers to move, and as a result, the passages through which lithium migrates (i.e., lithium path) are blocked and thus lithium ions cannot migrate smoothly, and accordingly, lifetime characteristics and capacity characteristics are degraded.

Meanwhile, the change in the Li—O interlayer spacing of a lithium composite transition metal oxide powder during charging and discharging is determined by a combination of the composition of the lithium composite transition metal oxide, types of doping and coating elements, particle size and the like, and not by a single factor.

The change in the Li—O interlayer spacing of a lithium composite transition metal oxide powder during charging may be measured by obtaining high resolution powder diffraction (hereinafter abbreviated as HRPD) data using synchrotron radiation and analyzing the obtained data according to a Rietveld method. Specifically, in a charged state, the change in Li—O interlayer spacing may be measured by the following method. First, a coin-type half-cell is fabricated by interposing a separator between a positive electrode, which includes a lithium composite transition metal oxide to be analyzed as a positive electrode active material, and a lithium metal negative electrode. A plurality of coin-type half-cells produced as described above are charged to different capacities. Subsequently, each of the secondary batteries is disassembled to separate the positive electrode therefrom. The positive electrode active material layer is scraped off from the separated positive electrode to obtain the lithium composite transition metal oxide powder in a charged state, which is then exposed to synchrotron radiation so that HRPD data can be obtained. By analyzing the obtained data according to the method of analyzing a crystal structure by the Rietveld method using the space group R-3m in the crystal structure model, the Li—O interlayer spacing of the lithium composite transition metal oxide powder at each degree of charging can be determined, and based on this result, the degree of change in Li—O interlayer spacing according to a degree of charging can be determined.

In addition, in the lithium composite transition metal oxide powder, the Li—O interlayer spacing at 100% SOC, that is, a fully charged state, may be greater than or equal to the Li—O interlayer spacing at 0% SOC.

In the case of lithium composite transition metal oxides having a high nickel content, the Li—O interlayer spacing thereof often decreases during charging and discharging such that it becomes smaller than the Li—O interlayer spacing before charging. When the Li—O interlayer spacing is decreased as such, lithium ions cannot migrate smoothly, such that problems such as lifetime characteristics being rapidly degraded may occur. Such a reduction in the Li—O interlayer spacing occurs as the lattice structure drastically changes during charging and discharging. However, when the above-described lithium composite transition metal oxide in which the Li—O interlayer spacing at 100% SOC is greater than or equal to the Li—O interlayer spacing at 0% SOC is used, since lithium ions are allowed to migrate smoothly, the rapid degradation in lifetime characteristics can be prevented.

The positive electrode active material may be included in an amount of 80 to 99 wt %, more specifically 85 to 98.5 wt %, based on the total weight of the positive electrode active material layer. When the content of the positive electrode active material satisfies the above-described range, excellent capacity characteristics can be exhibited.

Meanwhile, the positive electrode of the present invention may further include a conductive material and/or a binder in addition to the positive electrode active material in the positive electrode active material layer.

The conductive material is used to impart conductivity to the electrode, and may be used without particular limitation as long as it does not cause a chemical change in a battery being produced and has electron conductivity. Specific examples of the conductive material include: graphite such as natural graphite, artificial graphite or the like; a carbon-based material such as carbon black, acetylene black, Ketjen black, channel black, furnace black, lamp black, thermal black, carbon fiber or the like; a metal powder or metal fiber of copper, nickel, aluminum, silver or the like; a conductive whisker such as zinc oxide, potassium titanate or the like; a conductive metal oxide such as titanium oxide or the like; and a conductive polymer such as a polyphenylene derivative or the like, which may be used alone or in combination of two or more thereof. The conductive material may be included in an amount of 0.1 to 15 wt % based on the total weight of the positive electrode active material layer.

The binder serves to improve the adhesion between positive electrode active material particles and the adhesion between the positive electrode active material and a current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, styrene-butadiene rubber (SBR), fluoro-rubber, various copolymers thereof and the like, which may be used alone or in combination of two or more thereof. The binder may be included in an amount of 0.1 to 15 wt % based on the total weight of the positive electrode active material layer.

The above-described positive electrode may be produced by a common method of producing a positive electrode, for example, by applying a positive electrode mixture prepared by dissolving or dispersing a positive electrode active material, a binder and/or a conductive material in a solvent onto a positive electrode current collector and then carrying out drying and rolling.

In this case, the solvent may be a solvent generally used in the art. Examples of the solvent include dimethyl sulfoxide (DMSO), isopropyl alcohol, N-methylpyrrolidone (NMP), acetone, water and the like, which may be used alone or in combination of two or more thereof. The usage amount of the solvent is not particularly limited, and is sufficient if it allows the viscosity of the positive electrode mixture to be appropriately adjusted considering the coating thickness, production yield, workability and the like of the positive electrode mixture.

Meanwhile, the positive electrode current collector is not particularly limited as long as it does not cause a chemical change in the battery and has conductivity. For example, stainless steel, aluminum, nickel, titanium, calcined carbon, or aluminum or stainless steel whose surface has been treated with carbon, nickel, titanium, silver or the like may be used. In addition, the positive electrode current collector may typically have a thickness of 3 to 500 and may have fine irregularities in a surface thereof to increase the adhesion with a positive electrode material. The positive electrode current collector may be used in any of various forms such as a film, a sheet, a foil, a net, a porous material, a foam, a non-woven fabric and the like.

Alternatively, the positive electrode may be produced by laminating, on a positive electrode current collector, a film prepared by casting the positive electrode mixture on a separate support and then removing it from the support.

(2) Negative Electrode

In the present invention, the negative electrode may be used without particular limitation as long as it is one that is typically used in a lithium secondary battery, and may include, for example, a negative electrode current collector and a negative electrode active material layer disposed on the negative electrode current collector.

The negative electrode current collector is not particularly limited as long as it does not cause a chemical change in the battery and has high conductivity. For example, copper, stainless steel, aluminum, nickel, titanium, calcined carbon, or copper or stainless steel whose surface has been treated with carbon, nickel, titanium, silver or the like, an aluminum-cadmium alloy or the like may be used. In addition, the negative electrode current collector may typically have a thickness of 3 μm to 500 μm, and like the positive electrode current collector, may have fine irregularities in a surface thereof to increase the adhesion with a negative electrode active material. The negative electrode current collector may be used in any of various forms such as a film, a sheet, a foil, a net, a porous material, a foam, a non-woven fabric and the like.

The negative electrode active material layer may include an optional binder and an optional conductive material in addition to the negative electrode active material.

As the negative electrode active material, any of various negative electrode active materials used in the art may be used without particular limitation. Specific examples of the negative electrode active material include: a carbonaceous material such as artificial graphite, natural graphite, graphitized carbon fiber, amorphous carbon or the like; a metallic compound capable of alloying with lithium, such as Si, Al, Sn, Pb, Zn, Bi, In, Mg, Ga, Cd, a Si alloy, a Sn alloy, an Al alloy or the like; a metal oxide capable of doping and dedoping lithium, such as $SiO_y$ (0<y<2), $SnO_2$, vanadium oxide or lithium vanadium oxide; a composite including the metallic compound and the carbonaceous material, such as a Si—C composite or a Sn—C composite; and the like, which may be used alone or in combination of two or more thereof. In addition, as the negative electrode active material, a metal lithium thin film may be used.

Meanwhile, the negative electrode active material may be included in an amount of 80 wt % to 99 wt % based on the total weight of the negative electrode active material layer.

The binder is a component that assists the binding among a conductive material, an active material and a current collector, and is typically added in an amount of 0.1 wt % to 10 wt % based on the total weight of the negative electrode active material layer. Examples of such a binder include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, styrene-butadiene rubber, nitrile-butadiene rubber, fluoro-rubber, various copolymers thereof and the like.

The conductive material is a component for further enhancing the conductivity of the negative electrode active material, and may be added in an amount of 10 wt % or less, preferably 5 wt % or less, based on the total weight of the negative electrode active material layer. Such a conductive material is not particularly limited as long as it does not cause a chemical change in the battery and has conductivity, and examples of a material usable as the conductive material include: graphite such as natural graphite, artificial graphite or the like; carbon black such as acetylene black, Ketjen black, channel black, furnace black, lamp black, thermal black or the like; a conductive fiber such as carbon fiber, metal fiber or the like; a metal powder such as carbon fluoride powder, aluminum powder, nickel powder or the like; a conductive whisker such as zinc oxide, potassium titanate or the like; a conductive metal oxide such as titanium oxide or the like; and a conductive material such as a polyphenylene derivative or the like.

The negative electrode active material layer may be prepared by applying a composition for forming a negative electrode active material layer, which is prepared by dissolving or dispersing a negative electrode active material, an optional binder and an optional conductive material in a solvent, onto a negative electrode current collector and then carrying out drying, or by laminating, on a negative electrode current collector, a film prepared by casting the composition for forming a negative electrode active material layer on a separate support and then removing it from the support.

(3) Separator

The separator is interposed between the negative electrode and the positive electrode, separating the positive electrode and the negative electrode and providing a passage for lithium ion migration. As the separator, a separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, an ethylene/methacrylate copolymer or the like or a stacked structure having two or more layers thereof, may be used. In addition, a common porous non-woven fabric, for example, a non-woven fabric made of high-melting-point glass fiber, polyethylene terephthalate fiber or the like may be used. Also, in order to ensure heat resistance or mechanical strength, a coated separator which includes a ceramic component or polymer material and is optionally in a single-layer or multi-layer structure may be used.

(4) Electrolyte

As the electrolyte, an organic liquid electrolyte, an inorganic liquid electrolyte, a solid polymer electrolyte, a gel-type polymer electrolyte, an inorganic solid electrolyte, a molten-type inorganic electrolyte or the like that is usable in a lithium secondary battery may be used without particular limitation.

Specifically, the electrolyte may include an organic solvent and a lithium salt.

As the organic solvent, a solvent which may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone or the like; an ether-based solvent such as dibutyl ether, tetrahydrofuran or the like; a ketone-based solvent such as cyclohexanone or the like; an aromatic hydrocarbon-based solvent such as benzene, fluorobenzene or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) or the like; an alcohol-based solvent such as ethyl alcohol, isopropyl alcohol or the like; a nitrile such as Ra—CN (Ra is a C2-C20 hydrocarbon group with a linear, branched or cyclic structure and may include a double-bond, an aromatic ring or an ether linkage) or the like; an amide such as dimethylformamide or the like; dioxolane such as 1,3-dioxolane or the like; or sulfolane.

As the lithium salt, a lithium salt that is conventionally used in an electrolyte for a lithium secondary battery may be used without particular limitation. For example, the lithium salt may be a lithium salt which has $Li^+$ as an cation and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ as an anion. Specifically, the lithium salt may include one or a mixture of two or more selected from the group consisting of LiCl, LiBr, LiI, LiClO$_4$, LiBF$_4$, LiB$_{10}$Cl$_{10}$, LiPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$ and LiCH$_3$SO$_3$, and additionally, an electrolyte salt commonly used in an electrolyte of a lithium secondary battery, such as a lithium imide salt represented as LiN(SO$_2$C$_2$F$_5$)$_2$ (lithium bis(perfluoroethanesulfon)imide (LiBETI)), LiN(SO$_2$F)$_2$ (lithium fluorosulfonyl imide (LiFSI)) or LiN(SO$_2$CF$_3$)$_2$ (lithium bis(trifluoromethanesulfon)imide) (LiTFSI)), may be used without limitation. Specifically, the electrolyte salt may include one or a mixture of two or more selected from the group consisting of LiPF$_6$, LiBF$_4$, LiCH$_3$CO$_2$, LiCF$_3$CO$_2$, LiCH$_3$SO$_3$, LiFSI, LiTFSI and LiN(C$_2$F$_5$SO$_2$)$_2$.

The amount of the lithium salt may be appropriately changed within a range generally available, and may be specifically included in an amount of 0.8 M to 3 M, specifically 0.1 M to 2.5 M, in the electrolyte.

In addition to the above-described electrolyte components, various additives may be used in the electrolyte for the purpose of improving the lifetime characteristics of the battery, suppressing a reduction in battery capacity, improving the discharge capacity of the battery or the like.

As the additive, the following may be used: an imide-based salt such as lithium bis(fluorosulfonyl)imide (LiFSI), lithium bis(trifluoromethylsulfonyl)imide or the like; a borate-based salt such as lithium bis(oxalato)borate (LiBOB), lithium difluoro(oxalato)borate (LiOdFB), tris(trimethylsilyl) borate (TMSB) or the like; a phosphate-based salt such as difluorophosphate or tris(trimethylsilyl) phosphate; a haloalkylene carbonate-based compound such as difluoroethylene carbonate or the like; or pyridine, triethylphosphite, triethanolamine, cyclic ether, ethylenediamine, n-glyme, hexamethylphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride or the like, which may be used alone or in combination. In this case, each of the additives may be included in an amount of 0.1 wt % to 10 wt % based on the total weight of the electrolyte.

The above-described lithium secondary battery of the present invention is useful in the field of portable devices such as mobile phones, notebook computers, digital cameras or the like, electric vehicles such as hybrid electric vehicles (HEVs), and the like.

The type of the lithium secondary battery of the present invention may be, but is not particularly limited to, a cylindrical type using a can, a prismatic type, a pouch type, a coin type or the like.

The lithium secondary battery of the present invention may be used not only in a battery cell used as a power source of a small device but also preferably as a unit battery in medium-to-large-sized battery modules including a plurality of battery cells.

MODES OF THE INVENTION

Hereinafter, the present invention will be described in more detail by way of specific examples.

Preparation Example 1

A lithium composite transition metal oxide powder doped with Al and Zr was prepared by dry-mixing $Ni_{0.88}Co_{0.09}Mn_{0.03}(OH)_2$, LiOH, $ZrO_2$ and $Al(OH)_3$ and firing the mixture at 760° C. for 12 hours.

After the lithium composite transition metal oxide prepared as described above was mixed with $H_3BO_3$, the mixture was thermally treated at 350° C. for three hours, and thereby a coating layer containing B was formed on the surface of the lithium composite transition metal oxide.

The obtained lithium composite transition metal oxide powder had a bimodal particle size distribution in which particles of 16 μm and particles of 5 μm were mixed.

Preparation Example 2

A lithium composite transition metal oxide doped with Al, Zr and W was prepared by dry-mixing $Ni_{0.88}Co_{0.09}Mn_{0.03}(OH)_2$, LiOH, $ZrO_2$, $WO_3$ and $Al(OH)_3$ and firing the mixture at 740° C. for 12 hours.

After the lithium composite transition metal oxide prepared as described above was mixed with $H_3BO_3$, the mixture was thermally treated at 350° C. for three hours, and thereby a coating layer containing B was formed on the surface of the lithium composite transition metal oxide.

The obtained lithium composite transition metal oxide powder had a unimodal particle size distribution having a D50 of 5 μm.

Preparation Example 3

A lithium composite transition metal oxide doped with Ti and W was prepared by dry-mixing $Ni_{0.90}Co_{0.08}Mn_{0.02}(OH)_2$, LiOH, $TiO_2$ and $WO_3$ and firing the mixture at 760° C. for 12 hours.

After the lithium composite transition metal oxide prepared as described above was mixed with $H_3BO_3$, the mixture was thermally treated at 350° C. for three hours, and thereby a coating layer containing B was formed on the surface of the lithium composite transition metal oxide.

The obtained lithium composite transition metal oxide powder had a unimodal particle size distribution having a D50 of 16 μm.

Preparation Example 4

A lithium composite transition metal oxide doped with Al, Zr and W was prepared by dry-mixing $Ni_{0.90}Co_{0.08}Mn_{0.02}(OH)_2$, LiOH, $ZrO_2$, $WO_3$ and $Al(OH)_3$ and firing the mixture at 760° C. for 12 hours.

After the lithium composite transition metal oxide prepared as described above was mixed with $H_3BO_3$, the mixture was thermally treated at 350° C. for three hours, and thereby a coating layer containing B was formed on the surface of the lithium composite transition metal oxide.

The obtained lithium composite transition metal oxide powder had a unimodal particle size distribution having a D50 of 16 μm.

Experimental Example 1

Each of the lithium composite transition metal oxides prepared in Preparation Examples 1 to 4 was mixed with a carbon black conductive material and a PVdF binder at a weight ratio of 96.5:1.5:2.0 in an N-methylpyrrolidone solvent to prepare a positive electrode mixture, which was subsequently applied to one surface of an aluminum current collector, dried at 130° C., and then rolled to produce a positive electrode.

A porous polyethylene separator was interposed between the positive electrode produced as described above and a negative electrode, and thereby an electrode assembly was produced. After the electrode assembly was placed in a case, an electrolyte was injected into the case, and thereby a lithium secondary battery (coin-type half-cell) was produced.

In this case, a lithium metal was used as the negative electrode, and an electrolyte which was prepared by dissolving lithium hexafluorophosphate ($LiFP_6$) at a concentration of 1 M in an organic solvent consisting of ethylene carbonate, dimethyl carbonate, and ethyl methyl carbonate mixed at a volume ratio of 3:4:3 was used as the electrolyte.

Eight lithium secondary batteries were prepared for each of the lithium composite transition metal oxides, and were charged at 0 mA/g, 40 mA/g, 80 mA/g, 120 mA/g, 160 mA/g, 200 mA/g, 240 mA/g, 278 mA/g, respectively. After subsequently separating the positive electrode from each lithium secondary battery, the positive electrode active material layer was scraped off therefrom to obtain the lithium composite transition metal oxide powder. The collected lithium composite transition metal oxide powder was placed in a radiation accelerator and was subjected to X-ray analysis, and thereby the Li—O interlayer spacing according to a degree of charging was determined.

The measurement results are shown in FIG. 1. In addition, the Li—O interlayer spacing (units: Å) according to SOC was calculated based on FIG. 1 by converting the charge capacity values into SOC values, and the results are shown in Table 1.

TABLE 1

| | Preparation Example 1 | Preparation Example 2 | Preparation Example 3 | Preparation Example 4 |
|---|---|---|---|---|
| 0% SOC | 2.6756 | 2.6767 | 2.6767 | 2.6765 |
| 14% SOC | 2.7134 | 2.7145 | 2.6483 | 2.7138 |
| 29% SOC | 2.7559 | 2.7575 | 2.6857 | 2.7825 |
| 43% SOC | 2.8052 | 2.8057 | 2.8047 | 2.8048 |
| 58% SOC | 2.9063 | 2.9082 | 2.908 | 2.9084 |
| 72% SOC | 2.8789 | 2.9179 | 2.8834 | 2.7683 |
| 86% SOC | 2.7220 | 2.7286 | 2.6894 | 2.7259 |
| 100% SOC | 2.6932 | 2.6768 | 2.6527 | 2.6440 |

As shown in Table 1 and FIG. 1, the lithium composite transition metal oxides prepared in Preparation Examples 1 to 3 underwent a 1% or less change in Li—O interlayer spacing in a SOC range of 58% to 72%, whereas the lithium composite transition metal oxide prepared in Preparation Example 4 underwent an about 4.8% change in Li—O interlayer spacing in a SOC range of 58% to 72%.

In addition, in the case of the lithium composite transition metal oxides prepared in Preparation Examples 1 and 2, the Li—O interlayer spacing was increased or hardly changed with full charging (100% SOC) compared to before charging (0% SOC), whereas in the case of the lithium composite transition metal oxides prepared in Preparation Examples 3 and 4, the Li—O interlayer spacing was reduced with full charging compared to before charging (0% SOC).

Example 1

A positive electrode mixture was prepared by mixing the lithium composite transition metal oxide prepared in Preparation Example 1 as a positive electrode active material, a carbon black conductive material and a PVdF binder at a weight ratio of 96.5:1.5:2.0 in an N-methylpyrrolidone solvent, and was subsequently applied to one surface of an aluminum current collector, dried at 130° C., and then rolled to produce a positive electrode.

A porous polyethylene separator was interposed between the positive electrode produced as described above and a negative electrode, and thereby an electrode assembly was produced. After the electrode assembly was placed in a case, an electrolyte was injected into the case, and thereby a lithium secondary battery (coin-type half-cell) was produced.

In this case, a lithium metal was used as the negative electrode, and an electrolyte which was prepared by dissolving lithium hexafluorophosphate (LiFP$_6$) at a concentration of 1 M in an organic solvent consisting of ethylene carbonate, dimethyl carbonate, and ethyl methyl carbonate mixed at a volume ratio of 3:4:3 was used as the electrolyte.

Example 2

A lithium secondary battery was produced in the same manner as in Example 1 except that the lithium composite transition metal oxide prepared in Preparation Example 2 was used as a positive electrode active material.

Example 3

A lithium secondary battery was produced in the same manner as in Example 1 except that the lithium composite transition metal oxide prepared in Preparation Example 3 was used as a positive electrode active material.

Comparative Example 1

A lithium secondary battery was produced in the same manner as in Example 1 except that the lithium composite transition metal oxide prepared in Preparation Example 4 was used as a positive electrode active material.

Experimental Example 2: Evaluation of Capacity Characteristics

The capacity characteristics of the lithium secondary batteries of Examples 1 to 3 and Comparative Example 1 were evaluated by the following method:

At room temperature (25° C.), each of the lithium secondary batteries was charged at a constant current of 0.2 C until 4.25 V was reached, under a condition of 0.005 C cut off, and was maintained for 20 minutes. Subsequently, the lithium secondary batteries were discharged at a constant current of 0.2 C, under a condition of 2.5 V cut off, and were maintained for 20 minutes. By designating these charging and discharging behaviors as one cycle, the charge and discharge capacities of the first cycle were measured. The measurement results are shown in Table 2.

Experimental Example 3: Evaluation of High-Temperature Lifetime Characteristics

The high-temperature lifetime characteristics of the lithium secondary batteries of Examples 1 to 3 and Comparative Example 1 were evaluated by the following method:

At an elevated temperature (45° C.), each of the lithium secondary batteries was charged in the CC/CV mode of 0.3 C until 4.25 V was reached, and was discharged at a constant current of 0.3 C until 2.5 V was reached. After carrying out 30 cycles of such charging and discharging, a capacity retention rate was measured. The measurement results are shown in the following Table 2.

TABLE 2

| | Charge capacity (mAh/g) | Discharge capacity (mAh/g) | Initial efficiency (%) | High-temperature lifetime characteristic: capacity retention rate (%) |
|---|---|---|---|---|
| Example 1 | 236.2 | 217.8 | 92.2 | 94.2 |
| Example 2 | 232.3 | 216.2 | 93.1 | 95.6 |
| Example 3 | 236.9 | 219.9 | 92.8 | 90.1 |
| Comparative Example 1 | 233.4 | 212.1 | 90.9 | 86.9 |

As shown in Table 2, compared to the lithium secondary battery of Comparative Example 1 in which a positive electrode active material undergoing a more than 3% change in Li—O interlayer spacing in a SOC range of 58% to 72% was used, the lithium secondary batteries of Examples 1 to 3, in which a positive electrode active material undergoing a 3% or less change in Li—O interlayer spacing was used, exhibited improved initial efficiency and improved high-temperature lifetime characteristics.

In addition, it was observed that the lithium secondary battery of Example 3, in which a positive electrode active material whose Li—O interlayer spacing decreased with full charging compared to before charging was used, exhibited slightly degraded high-temperature lifetime characteristics compared to the lithium secondary batteries of Examples 1 and 2, in which a positive electrode active material whose Li—O interlayer spacing increased with full charging compared to before charging was used. It is speculated that this is because when the Li—O interlayer spacing decreases with full charging as in the case of Example 3, the mobility of lithium ions decreases.

The invention claimed is:
1. A lithium secondary battery comprising:
a positive electrode;
a negative electrode;
a separator interposed between the positive electrode and the negative electrode; and
an electrolyte,
wherein the positive electrode includes a positive electrode active material of a lithium composite transition metal oxide powder having a layered structure and a nickel content accounting for 85 atm % or more of total transition metals, wherein the lithium composite transition metal oxide powder undergoes a 3% or less change in lithium-oxygen (Li—O) interlayer spacing in a state-of-charge (SOC) range of 58% to 72%.

2. The lithium secondary battery of claim 1, wherein the lithium composite transition metal oxide powder undergoes a 1% or less change in the Li—O interlayer spacing in the SOC range of 58% to 72%.

3. The lithium secondary battery of claim 1, wherein, in the lithium composite transition metal oxide powder, a Li—O interlayer spacing at 100% SOC is greater than or equal to a Li—O interlayer spacing at 0% SOC.

4. The lithium secondary battery of claim 1, wherein the lithium composite transition metal oxide is represented by Chemical Formula 1:

$$Li_x[Ni_aCo_bMn_cM_d]O_2 \quad \text{[Chemical Formula 1]}$$

wherein, in Chemical Formula 1,

M is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B and Mo, and $0.9 \leq x \leq 1.2$, $0.85 \leq a \leq 0.99$, $0 < b < 0.15$, $0 < c < 0.15$, and $0 < d < 0.15$.

5. The lithium secondary battery of claim 4, wherein the M includes two or more elements selected from the group consisting of W, Zr, Al, Ti and Mg.

6. The lithium secondary battery of claim 4, wherein the M includes W and one or more elements selected from the group consisting of Zr, Al, Ti and Mg.

7. The lithium secondary battery of claim 1, wherein the lithium composite transition metal oxide includes, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S.

8. A positive electrode active material for a lithium secondary battery, comprising: a lithium composite transition metal oxide powder having a layered structure and a nickel content accounting for 85 atm % or more of total transition metals, wherein the lithium composite transition metal oxide powder undergoes a 3% or less change in Li—O interlayer spacing in a SOC range of 58% to 72%.

9. The positive electrode active material of claim 8, wherein the lithium composite transition metal oxide powder undergoes a 1% or less change in the Li—O interlayer spacing in the SOC range of 58% to 72%.

10. The positive electrode active material of claim 8, wherein, in the lithium composite transition metal oxide powder, a Li—O interlayer spacing at 100% SOC is greater than or equal to a Li—O interlayer spacing at 0% SOC.

11. The positive electrode active material of claim 8, wherein the lithium composite transition metal oxide is represented by Chemical Formula 1:

$$Li_x[Ni_aCo_bMn_cM_d]O_2 \quad \text{[Chemical Formula 1]}$$

wherein, in Chemical Formula 1,

M is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B and Mo, and $0.95 \leq x \leq 1.2$, $0.85 \leq a \leq 0.99$, $0 < b < 0.15$, $0 < c < 0.15$, and $0 < d < 0.15$.

12. The positive electrode active material of claim 11, wherein the M includes two or more elements selected from the group consisting of W, Zr, Al, Ti and Mg.

13. The positive electrode active material of claim 11, wherein the M includes W and one or more elements selected from the group consisting of Zr, Al, Ti and Mg.

14. The positive electrode active material of claim 8, wherein the lithium composite transition metal oxide includes, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S.

* * * * *